United States Patent [19]

Harney et al.

[11] 4,287,273
[45] Sep. 1, 1981

[54] PLURAL CELL BATTERY STRUCTURE

[75] Inventors: David E. Harney; Marilyn J. Harney, both of Painesville, Ohio; Matthew O'Boyle, Timonium, Md.

[73] Assignee: Catalyst Research Corporation, Baltimore, Md.

[21] Appl. No.: 136,935

[22] Filed: Apr. 3, 1980

[51] Int. Cl.³ .............................................. H01M 6/14
[52] U.S. Cl. .................................. 429/153; 429/160; 429/178; 429/213
[58] Field of Search ............... 429/153, 152, 154, 142, 429/160, 162, 112, 115, 212, 213, 161, 178

[56] References Cited

U.S. PATENT DOCUMENTS

| | | | |
|---|---|---|---|
| 2,491,640 | 12/1949 | Blake et al. | 429/152 X |
| 2,707,199 | 4/1955 | Ruben | 429/153 |
| 3,677,822 | 7/1972 | Bush | 429/112 |
| 3,841,914 | 10/1974 | Boyle et al. | 429/162 X |
| 4,061,841 | 12/1977 | Sharma et al. | 429/112 |
| 4,119,769 | 10/1978 | Schneider et al. | 429/112 |
| 4,148,975 | 4/1979 | Schneider et al. | 429/213 X |
| 4,221,849 | 9/1980 | Harney | 429/112 |

*Primary Examiner*—Anthony Skapars
*Attorney, Agent, or Firm*—Reed, Smith, Shaw & McClay

[57] ABSTRACT

A battery structure using a plurality of cells in stacked array wherein each cell comprises an anode having a centrally positioned opening and flange positioned about the periphery of the opening for contact with the periphery of the opening of an adjacent anode. Each cell includes a pelletized depolarizer material that extends beyond the perimeter of the anode but coextensive with the anode flange. An outer encasement member receives the stacked array so that the depolarizer pellets are in electrical contact with the inner surface of the encasement. The encasement means includes a top member having an opening located to align with the openings in the anode and anode collector positioned through said opening in the top member and electrically insulated therefrom and in electrical contact with each of said anode flanges.

9 Claims, 5 Drawing Figures

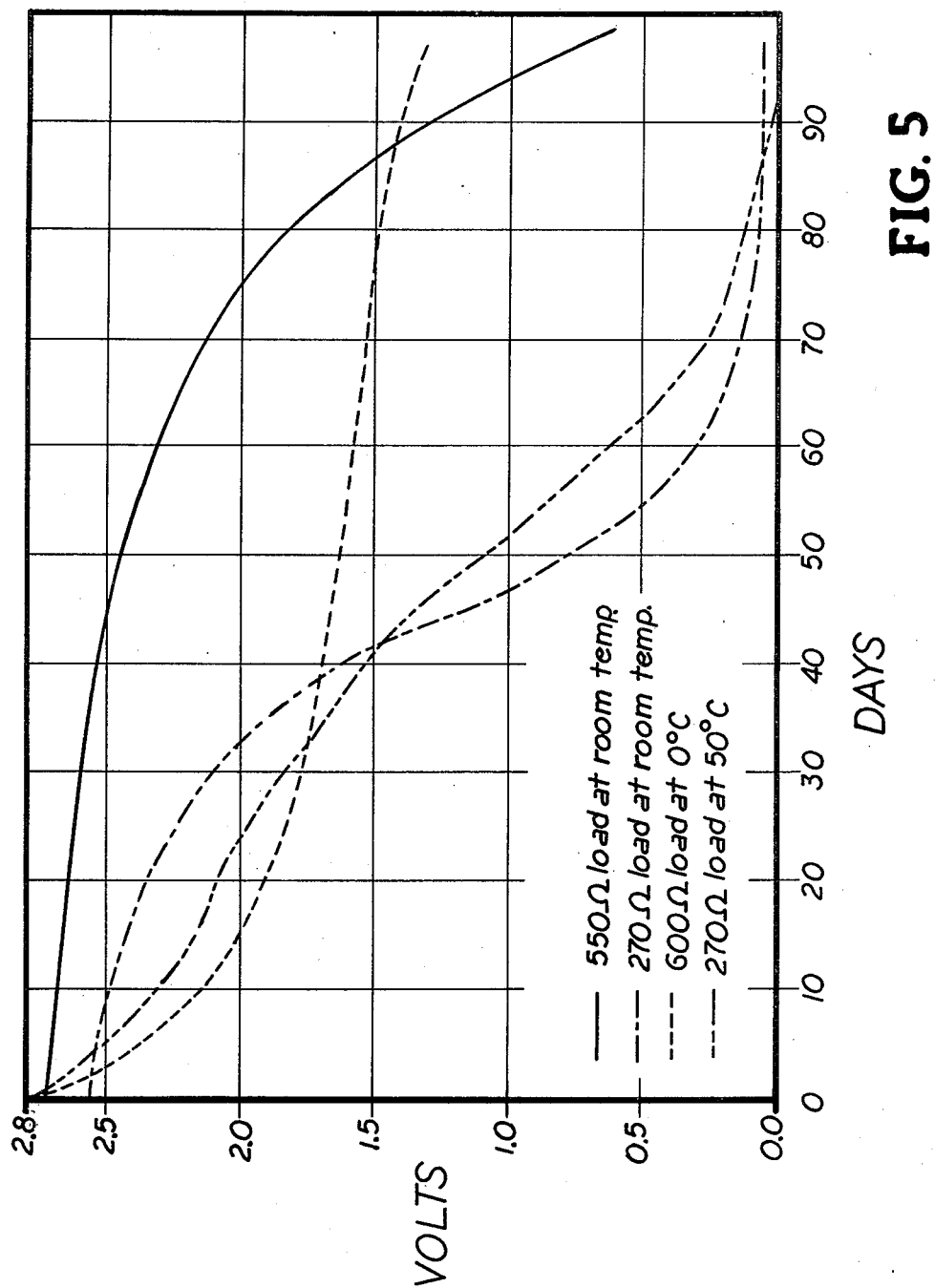

PLURAL CELL BATTERY STRUCTURE

FIELD OF THE INVENTION

The invention relates to a battery structure comprising a plurality of cells in stacked array in which the anode of each cell is electrically connected to a central collector which extends the length of the structure and, in particular, to a battery having a plurality of lithium halide cells in stacked array.

BACKGROUND OF THE INVENTION

Small general purpose mercury or alkaline batteries are well known and commercially available. This is also true with respect fo specialty batteries such as those used in cardiac pacer devices, watches and the like which take advantage of electrochemical systems in which the depolarizer is a charge transfer complex and the anodes are of various metals, such as lithium. Illustrative of these batteries are U.S. Pat. Nos. 3,653,966, 3,660,163, 3,723,183, 3,817,791, 3,874,929, 3,937,635, 3,957,533, 4,049,890 and 4,072,803. See also U.S. Pat. No. 4,217,403, issued Apr. 12, 1980 (Ser. No. 896,639, filed Apr. 17, 1978).

Lithium halide batteries have been found to have extended life and capacity for use in cardiac pacer devices and watch applications, see for example, U.S. Pat. Nos. 3,660,163 3,674,562 and 4,148,975. However, such electrochemical systems have not been found useful in general purpose consumer batteries commonly known as "C" and "D"-sized dry cells which are commercially available from leading battery manufacturers. The lithium halide cells have been found deficient since they do not have the necessary power capacity for high drain applications, for example, in battery operated flashlights.

It is, therefore, an object of the present invention to provide a battery structure which has the same size as a conventional "C" or "D" dry cell and utilizes the advantages of the lithium halide electrochemical system. It is contemplated that the batteries of the present invention may not have the same current capacity as the conventional alkaline or mercury dry cells, but will be, nevertheless, suitable for use in numerous applications requiring extended life such as traffic counters. Accordingly, it is an object of the present invention to provide a lithium halide battery which can be substituted for conventional "C" or "D" batteries in applications not requiring long periods of high drain. It is also an object of the invention to provide a battery having very low self-discharge characteristics.

SUMMARY OF THE INVENTION

Generally, the present invention comprises a stacked array of cells. Each cell includes an anode having an opening therethrough at its center. Preferably the anode is a disc of lithium having a thickness of about 0.022. Around the periphery of the opening is positioned an upright, preferably annular, flange which is adapted to abut the bottom of and align with the opening periphery of an adjacent cell of the stacked array.

Positioned on each anode and extending slightly beyond the perimeter of the outer edge of the anode is a depolarizer pellet. Preferably the depolarizer is a charge-transfer complex mixed with an excess of halogen such as disclosed in U.S. Pat. No. 4,148,975 or (Ser. No. 73,188 filed Sept. 7, 1979), both of which disclosures are incorporated by reference herein. The depolarizer pellet includes an opening adapted to concentrically align with the annular flange of the anode such that inner surface of the pellet opening is in contact with the outer surface of the anode flange.

In commercial embodiments, it is desirable that the thickness of the pellet and height of the flange be substantially the same. Since the electrolyte layer, which normally forms in situ, is coextensive with the area of contact between the depolarizer pellet and its associated anode, including the anode flange, additional surface area capacity can be achieved by positioning the outer surface of the depolarizer pellet in contact with the bottom anode surface of an adjacent cell.

The cells are stacked in a vertical array much the same way as thermal cells have been before. See U.S. Pat. No. 4,119,769. The cells of the present invention, however, are positioned so that the anode flanges of each cell align. In a preferred embodiment, the top surface of each flange of each cell is dimensioned to make contact with the surface of an adjacent anode.

The battery of the present invention also includes an encasement means, preferably made of stainless steel or a similar material which is conductive but resistant to depolarizers and electrolytes used therein. The encasement means is preferably a cylinder adapted to receive the stacked array of cells so that only the extending depolarizer contacts the inner surface of the encasement means. To prevent short circuits, electrical insulation is provided between the base of the encasement means and the bottom most cell. In its normal configuration, the encasement means functions as one of the batteries' terminals. However, the encasement can be insulated from the depolarizer to provide a battery having a pair of terminal pins.

A top means is provided which hermetically seals the array of cells contained in the encasement means. The top includes an opening therethrough which aligns with the openings in the stacked array of cells. Preferably, an insulator is positioned between the top means and top most cell in the array. To assure good electrical conductivity, the top is bonded to the encasement member under compression to provide a compressive force on the array of cells. The top means also includes a ferrule positioned in the opening through which an anode collector is sealing positioned to form a terminal. In the case where the encasement means does not function as a terminal, a second ferrule is positioned through the top as the second terminal.

The anode collector is preferably a rod made from stainless steel or the like having a diameter slightly larger than the diameter of the anode openings and a length equal to the distance between the base insulator and the top of the ferrule. The anode collector is positioned through the ferrule opening and the anode openings of each of the cells. Because the collector has a slightly larger diameter than that of the openings and because the anode flanges are relatively soft, bonding occurs between the flanges and adjacent anodes as well as between the flanges and anode collector. The anode collector is sealingly bonded to the ferrule to provide the negative battery terminal. And, in the case where the depolarizer is in electrical contact with the encasement means, the encasement means becomes the positive terminal.

The anode collector and encasement means connect the separate cells in parallel to provide a battery having substantially greater power density over other similar halide cells of the prior art. Other advantages will become apparent from a perusal of the following detailed description of the best mode contemplated for the invention taken together with the accompanying drawings.

BRIEF DESCRIPTION OF THE DRAWINGS

FIG. 5 is a graph showing typical discharge characteristics of the batteries of the present invention.

PREFERRED EMBODIMENT

Figure 1:
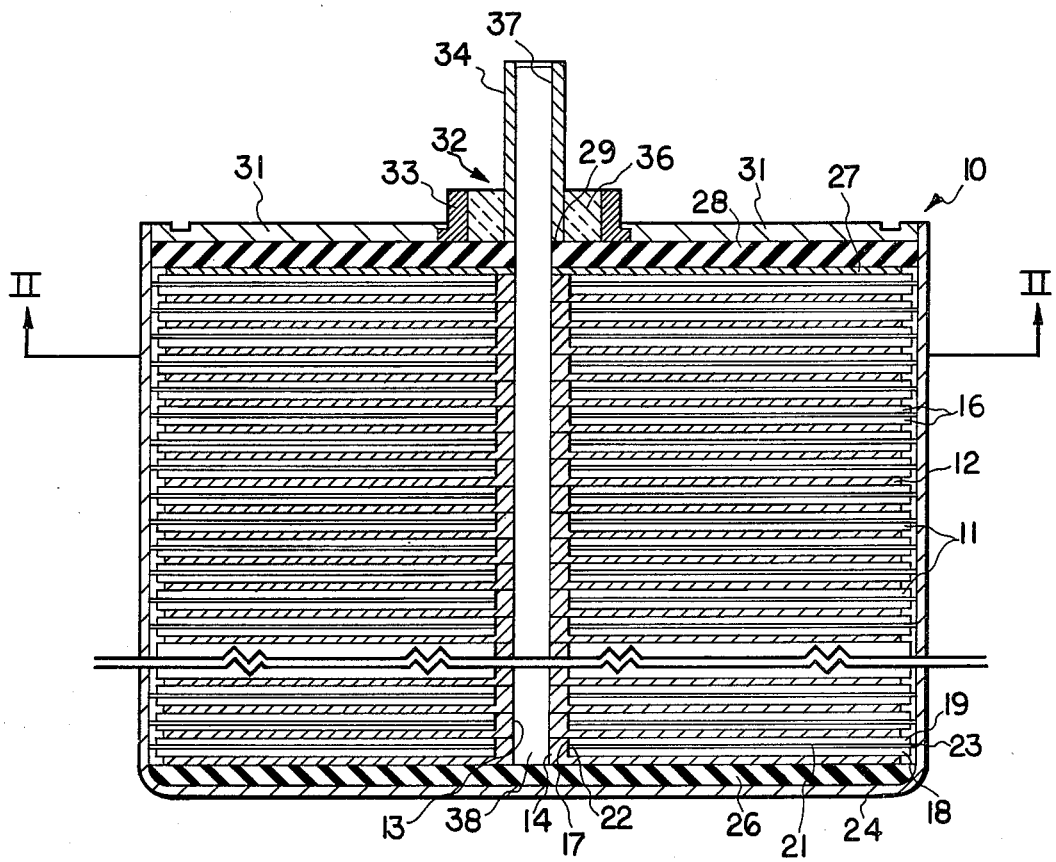
FIG. 1 is a sectional elevation of the battery of the present invention showing a number of cells in stacked array.
Figure 2:
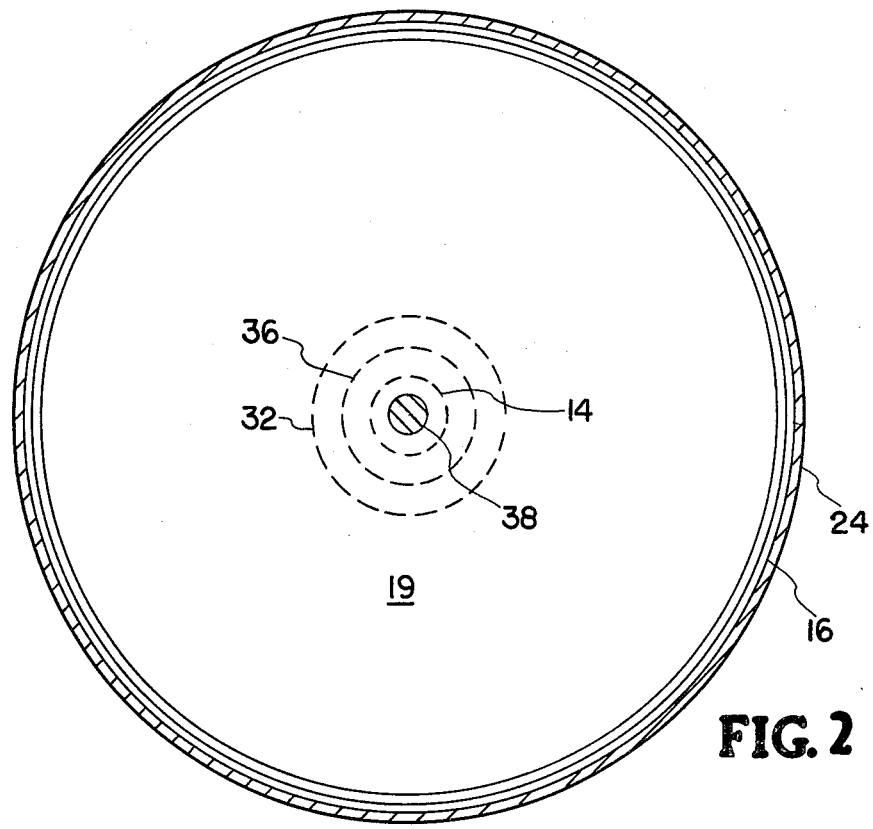
FIG. 2 is a section taken along line II—II of FIG. 1.
Figure 3:
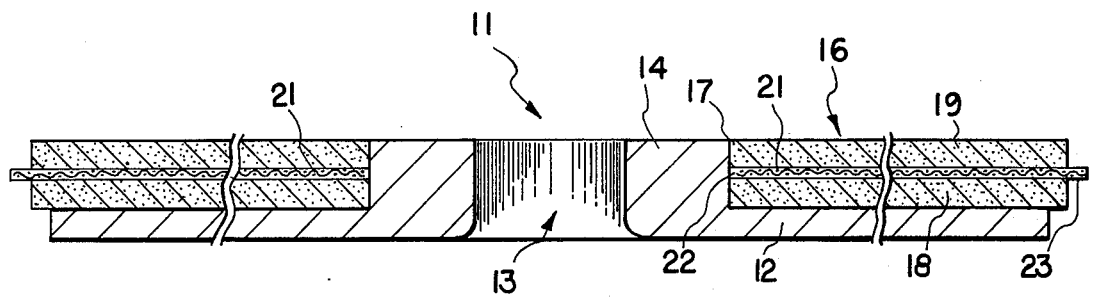
FIG. 3 is a partial enlargement of one of the cells shown in the battery of FIG. 1.

With reference to FIG. 1, battery 10 comprises a plurality of cells 11 positioned in stacked array. Each cell includes an anode 12 which is preferably made from lithium and which is in the form of a disc. An opening 13 is provided in the center of anode disc 12 and an annular flange 14 is located about the periphery of that opening. Preferably, anode flange 14 is formed as an integral part of the anode 12.

A depolarizer pellet 16 having an opening 17 is concentrically positioned on anode 12. The inner surface of opening 17 is preferably dimensioned and positioned so as to be in contact with the outer annular surface of flange 14. The diameter of pellet 16 is greater than the diameter of anode disc 12 and, thereby, extends slightly beyond the outer perimeter of anode disc 12. This extension provides electrical contact between the depolarizer pellet and the positive terminal or cathode collector which in this embodiment is the encasement member.

As can be understood, it is desirable to achieve the greatest degree of contact between the depolarizer and cathode collector. Consequently, it is desirable to provide such depolarizer extension with respect to the entire pellet. It is also preferable to make depolarizer 16 out of first and second pellets 18 and 19, respectively, and position between said pellets a cathode collector 21. Cathode collector 21 preferably comprises a metal, such as 304 stainless steel in the form of a wire screen. Cathode collector 21 is of substantially the same configuration as pellet 16, except that opening 22 in the screen is of greater diameter than the outer dimension of flange 14 to avoid contact therewith. Also, the diameter of collector 21 is greater than the diameter of pellet 16 so that ends 23 extend slightly beyond the periphery of the pellet to make contact with the inner surface of the encasement means or positive terminal. Typically the diameter of collector 21 is slightly greater than the diameter of the encasement means. The use of a cathode collector is preferred since it assures that each cell is electrically connected within the battery and greatly facilitates high production assembly by eliminating the need for maintaining the depolarizer pellets at close tolerances.

Battery 10 includes an encasement means 24, preferably made from 304 stainless steel. Encasement means 24 is typically dimensioned to the same sizes as conventional "C" and "D" batteries. Obviously, larger sizes may be used if desired. Positioned within the base encasement means 24 is a first insulator 26 which is designed to cover the entire base of encasement means 24 or at least as much of the base as could be contacted by an anode 12. Insulator 26 prevents electrical contact between anode 12 and encasement means 24 and is preferably made from a thin film of Halar ®.

The stacked array of cells 11 is positioned within encasement means 24 such that the perimeters of depolarizer pellets 16 make contact with the inner surface of the side walls of encasement means 24. Preferably, however, only ends 23 of collector 21 need be in contact with the inner surface of the encasement means. When the array of cells is positioned within the encasement means 24 during manufacture, collector ends 23 are bent upwardly between the edge of the upper pellet and the side walls because of the tight fit. Thus by using a collector precise tolerances do not have to be maintained.

In a battery of the standard "D" size, the stacked array comprises between 24 and 25 individual cells. However, as can be clearly understood from the description the number of cells 11 may vary depending on the size of depolarizer pellets, anode and electrical characteristics of the battery desired. In most cases though, a large number of cells will be desired so that electrical contact must be effectively made between each cell and the respective terminals.

An anode plate 27 is preferably positioned on top of the uppermost cell 11. Anode plate 27 does not include a flange about the periphery of its opening, but is designed to contact the surface of the uppermost depolarizer pellet and anode flange 14 of uppermost cell 11. While plate 27 is not necessary for proper performance of the battery, it does provide additional surface area between the anode and depolarizer which would otherwise be lost.

Positioned over anode plate 27 is second or top insulator 28 which is preferably designed to cover the entire top surface of the stacked array of cells 11 and which is made from Halar ®. Insulator 28 includes at least one opening 29 which is sized substantially the same as anode openings 13 of each cell. Sealingly positioned over second insulator 28 is top 31. Top 31 includes ferrule 32 comprising concentric outer and inner members 33 and 34, respectively. Outer member 33 is electrically insulated from inner member 34 by means of insulator 36 which is preferably glass. Inner member 34 includes an opening 37 sized substantially the same as the openings 13 in each of the cells. The top is secured to the edge of encasement means 24 by welding or bonding to provide a leak-proof seal. Preferably during attachment, the top maintains a pressure of about 50 psi on the stacked array.

Positioned through opening 37 of furrule 31 is anode collector 38. Anode collector 38 extends from the top of inner member 37 to first on base insulator 26 and is preferably made from 304 stainless steel. Anode collector 38 is preferably dimensioned to be slightly larger ("e.g., 0.001") than the size of anode openings 13 through which it is inserted. The anode collector is, therefore, designed to make positive electrical contact with each anode flanges 14 the stocked array of cells. This slight oversizing results in deformation of flanges 14 when the flanges are made of a soft metal, such as lithium, to assure not only good electrical contact between each flange and the anode collector, but also between respective flanges.

While it is generally preferable to insert anode collector 38 through openings 13 after assembly of the stacked array of cells into the encasement means and attachment of top 31 to encasement means 24, individual cells may be positioned over the anode collector so as to assemble the array of cells prior to placing the array within the encasement means. Thus, assembly of the relative components within the encasement means is not critical, but rather a function of the ease of fabrication, techniques employed and machine availability.

Figure 4:
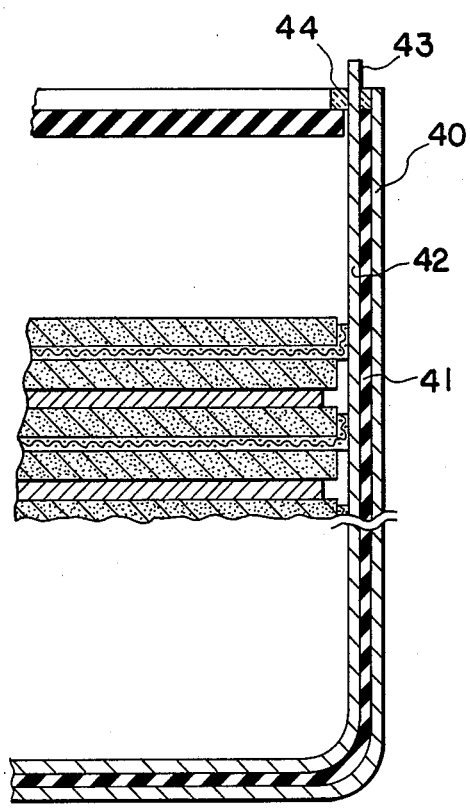
FIG. 4 is a sectional elevation showing a battery which is the same as the battery shown in FIG. 1 except a separate positive terminal is provided.

With reference to FIG. 4, a battery is partially shown in which a separate positive terminal is provided. The battery shown in FIG. 4 is identical to battery 10 shown in FIG. 1 except an insulator 41 is positioned between the cathode collector ends 23 and encasement 40. Insulator is preferably a thin film of Halar ® deposited within encasement 40. A current collector 42 is positioned between ends 23 and insulator 41 to electrically connect ends 23 with terminal 43. Terminal 43 comprises a portion of collector 42 which extends through second opening in the top which is insulated therefrom by seal 44. As with battery 10 shown in FIG. 1, the battery depicted in FIG. 4 would include a base insulator and anode collector. Accordingly, it is to be understood that the present invention encompasses batteries having a second terminal separate from the encasement means.

With reference to FIG. 5, batteries of the present invention in the form of a conventional "D" battery were tested under various loads at different temperatures. Each battery included 24 cells, each cell having an anode 0.021 inch in thickness and depolarizer pellet 0.058 inch in thickness. The pellets were prepared from a mixture of 30 gm. iodine, 3.25 gms. poly-2-vinyl pyridine, 1 gm. crystal violet and 1.5 gms. magnesium oxide. The graph of FIG. 5 is representative of the batteries of the present invention configured in the "D" size.

While presently preferred embodiments of the invention have been shown and described in particularity, the invention may be otherwise embodied within the scope of the appended claims.

What is claimed is:

1. A primary battery comprising:
   A. an electrically conductive encasement means having a base portion, said base portion including a first insulating means;
   B. a stacked array of cells extending from said first insulating means to the top of the encasement means, each of said cells consisting essentially of an anode and a pelletized depolarizer, said depolarizer being in direct contact without any separating layer, except an in situ formed electrolytic layer, with said anode and the anode of an adjacent cell, said anode and depolarizer of each cell being relatively positioned so that said cell is in electrical contact with the inner surface of said encasement means through said depolarizer of each cell;
   C. a second insulator means positioned substantially coextensively over said array;
   D. means for electrically connecting each of said anodes in parallel; and
   E. an electrically conductive top means sealingly attached to said encasement means and including a terminal electrically insulated therefrom, said terminal being electrically connected to said means for electrically connecting each of said anodes.

2. A primary battery as set forth in claim 1 wherein each cell comprises an anode having an opening therethrough; said pelletized depolarizer including an opening concentrically aligned with but larger than the opening in the anode; and said means for electrically connecting each of said means for electrically connecting each of said anodes comprising a metal collector extending from said first insulator to said top means and in electrical contact with each of said anodes through abuttment with the peripheris of the associated openings of said anodes.

3. A primary battery as set forth in claim 2 wherein said openings in each of said anodes and depolarizer pellets are centrally located and wherein the openings of associated depolarizer pellets are concentrically aligned with respect to the anode openings.

4. A primary battery as set forth in claim 1, 2 or 3 wherein said depolarizer includes first and second halves having a current collector positioned therebetween, said current collector having a size slightly greater than said depolarizer pellet for contact with said encasement means but not with said anode.

5. A primary battery as set forth in claims 1, 2 or 3 in which said anode comprises lithium and said depolarizer pellets comprise a charge transfer complex and a halogen.

6. A primary battery comprising:
   A. an encasement means having a base portion, said base portion having a first insulating means;
   B. a stacked array of cells coextensively positioned with said encasement means but not in electrical contact therewith, each of said cells consisting essentially of an anode and pelletized depolarizer thereon, said depolarizer being in direct contact without any separating layer, except an in situ formed electrolytic layer, with the anode of an adjacent cell said depolarizers of said cells being adapted to extend beyond the perimeter of the anodes for electrical contact with each other;
   C. a second insulator means positioned over said array of cells;
   D. means for electrically connecting in series each of said anodes;
   E. means for electrically connecting in series each of said depolarizer pellets;
   F. top means sealingly attached to said encasement means and including first and second terminals electrically connected to the respective means for connecting said anode and depolarizer and insulated from said top mean.

7. A primary battery as set forth in claim 6 wherein each cell comprises an anode having an opening therethrough; said depolarizer pellet including an opening concentrically aligned with but larger than said opening in the anode; and said means for electrically connecting said anodes comprising a metal collector positioned through and in contact with the peripheral of each anode opening.

8. A primary battery as set forth in claims 6 or 7 in which the said depolarizer pellets extend beyond the perimeter of its associated anode and said means for electrically connecting said pellets comprises a metal collector in contact with each of said pellets but insulated from said encasement means extending from said first insulator to said second terminal.

9. A primary battery as set forth in claims 6 or 7 wherein said anode comprises lithium and said depolarizer pellets comprise a charge transfer complex and a halogen.

* * * * *